(12) United States Patent
Rabinovici et al.

(10) Patent No.: US 6,505,284 B1
(45) Date of Patent: Jan. 7, 2003

(54) FILE SEGMENT SUBSYSTEM FOR A PARALLEL PROCESSING DATABASE SYSTEM

(75) Inventors: Sorana Rabinovici, Woodland Hills, CA (US); Dennis R. Calkins, Carson, CA (US)

(73) Assignee: NCR Corporation, Dayton, OH (US)

( * ) Notice: Subject to any disclaimer, the term of this patent is extended or adjusted under 35 U.S.C. 154(b) by 346 days.

(21) Appl. No.: 09/603,786

(22) Filed: Jun. 26, 2000

(51) Int. Cl.[7] .............................................. G06F 12/00
(52) U.S. Cl. ........................ 711/170; 711/133; 711/136; 711/163
(58) Field of Search ................................ 711/133, 136, 711/163, 170

(56) References Cited

U.S. PATENT DOCUMENTS

| | | | |
|---|---|---|---|
| 5,519,846 A | | 5/1996 | Swenson |
| 5,588,138 A | * | 12/1996 | Bai et al. ..................... 709/100 |
| 5,651,136 A | * | 7/1997 | Denton et al. ............... 711/118 |
| 5,652,853 A | | 7/1997 | Duvalsaint et al. |
| 5,778,395 A | | 7/1998 | Whiting et al. ............. 707/204 |
| 5,832,484 A | * | 11/1998 | Sankaran et al. ............. 707/8 |
| 6,078,994 A | | 6/2000 | Carey |

OTHER PUBLICATIONS

"Dual Task Hardware Partitioned Local Working Store" IBM Technical Disclosure Bulletin, IBM Corp. New York, US, vol. 40, No. 2, Feb. 1, 1997, pp. 29–31, XP000692159, ISSN 0018–8689.

H.P. Katseff & B.S. Robinson, "Predictive Prefetch in the Nemesis Multimedia Information Service," ACM 1994, pp. 201–209.

W.C. Brantley, K.P. McAuliffe, J. Weiss, "The Cache," IEEE, 1985, pp. 782–789.

A. Witkowski, F. Carino & P. Kostamaa, "NCR 3700—The Next Generation Industrial Database Computer," Proceeding of the 19th VLDB Conference, Dublin, Ireland, 1993, 14 pgs.

F. Carino, Jr., W. Sterling, P. Kostamaa, "Industrial Database Supercomputer Exegesis: The DBC/1012, The NCR 3700, The Ynet, and The Bynet,"Teradata Advanced Concepts Laboratory, pp. 139–157.

"The Memory Management Glossary: B, buddy system," http://www.xanalys.com/software_tools/mm/glossary/b.html, Mar. 24, 2000, 1 pg.

"The Memory Management Glossary: B, binary buddies," http://www.xanalys.com/software_tools/mm/glossary/b.html, Mar. 24, 2000, 1 pg.

"The Memory Management Glossary: F, Fibonacci buddies," http://www.xanalys.com/software_tools/mm/glossary/f.html, Mar. 24, 2000, 1 pg.

"The Memory Management Glossary: W, weighted buddies," http://www.xanalys.com/software_tools/mm/glossary/w.html, Mar. 24, 2000, 1 pg.

P.R. Wilson, M.S. Johnstone, M. Neely, D. Boles, "Dynamic Storage Allocation: A Survey and Critical Review," Department of Computer Sciences, University of Texas at Austin, 1995, pp. 37–40.

"The Memory Management Glossary: D, double buddies," http://www.xanalys.com/software_tools/mm/glossary/d.html, Mar. 24, 2000 1pg.

* cited by examiner

Primary Examiner—Reba I. Elmore
(74) Attorney, Agent, or Firm—Gates & Cooper (57) ABSTRACT

A File SeGment (FSG) subsystem of a PDE (parallel database extension) provides services for managing and allocating secondary memory such as cache, providing data commits and retrieval operations on disk, and providing routines to perform disk I/O (Input/Output) and other memory operations for a file system. The FSG subsystem provides for the determination of the amount of cache that may be utilized, locking that portion of cache, using a buddy memory management system to manage the cache, using one or more hash aging queues to determine when to free up cache, permitting preloads of data into the cache, and asynchronously accepting an I/O completion action from a user prior to completion of an operation and performing such an I/O completion action.

39 Claims, 5 Drawing Sheets

FILE SEGMENT SUBSYSTEM FOR A PARALLEL PROCESSING DATABASE SYSTEM

CROSS REFERENCE TO RELATED APPLICATION

This application is related to the following co-pending and commonly assigned patent applications, which are incorporated by reference herein:

application Ser. No. 09/410,389, now U.S. Pat. No. 6,351, 749, entitled "MULTI-THREADED MULTI-TASKING ARCHITECTURE FOR A RELATIONAL DATABASE MANAGEMENT SYSTEM," filed on Sep. 30, 1999, by Douglas P. Brown et al., and application Ser. No. 09/603,787, entitled "SCRATCH SEGMENT SUBSYSTEM FOR A PARALLEL PROCESSING DATABASE SYSTEM," filed on the same date herewith, by Sorana Rabinovici et al.,

BACKGROUND OF THE INVENTION

1. Field of the Invention

This invention relates in general to a relational database management system, and in particular, to memory management on a parallel processing database system.

2. Description of Related Art

The purpose of this invention is to manage cache in a transparent and platform independent manner. Further, the purpose is to manage cache such that only one entity manages the cache. If more than one entity manages the cache (e.g., the operating system or other application and the system of the invention), data stored in the cache may be swapped out to storage resulting in the existence of the data in two independent yet unrelated locations. The problem is to enable such capabilities in a parallel processing relational database management system (RDBMS) or database system (DBS) that can execute on both WINDOWS NT™ and UNIX operating systems for both symmetric multi-processing (SMP) and massively parallel processing (MPP) hardware architectures. The problem for the DBS is to design it in such a manner as to allow the DBS to execute independent of operating system models.

To accommodate the various operating systems, cache and shared memory must be controllable by a single entity within the system and be lockable and coherent among multiple processes. To provide these abilities in the UNIX environment, pages are merely allocated and mapped to a virtual page table that may be directly modified. However, such allocation, mapping, and direct page table modification is not available or possible in the WINDOWS NT operating system.

SUMMARY OF THE INVENTION

To overcome the limitations in the prior art described above, and to overcome other limitations that will become apparent upon reading and understanding the present specification, the present invention discloses a parallel processing architecture for a database system (DBS) that manages and allocates secondary memory such as cache, provides data commits and retrieval operations on disk, and provides routines to perform disk I/O (Input/Output) and other memory operations for a file system. The DBS is implemented as a shared nothing, single database image utilizing Parallel Database Extensions (PDEs) comprised of various subsystems for managing memory and providing storage locations for threads.

Embodiments provide for a File SeGment (FSG) subsystem of the PDE that provides services for managing and allocating secondary memory such as cache, providing data commits and retrieval operations on disk, and providing routines to perform disk I/O (Input/Output) and other memory operations for a file system. The FSG subsystem provides for the determination of the amount of cache that may be utilized, locking that portion of cache, using a buddy memory management system to manage the cache, using one or more hash aging queues to determine when to free up cache, permitting preloads of data into the cache, and accepting synchronous or asynchronous I/O requests from a user.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Overview

A system determines the amount of cache that can be utilized. The system locks that portion of cache and allocates portions of the cache upon request. Further, when the level of available cache is below a predetermined threshold, a daemon of the system utilizes a buddy management system, hash queues, and aging techniques to free portions of the cache. The system is also responsible for data commit and retrieval operations on the disk, and provides routines to perform disk I/O and other memory operations.

Hardware Environment

Figure 1:
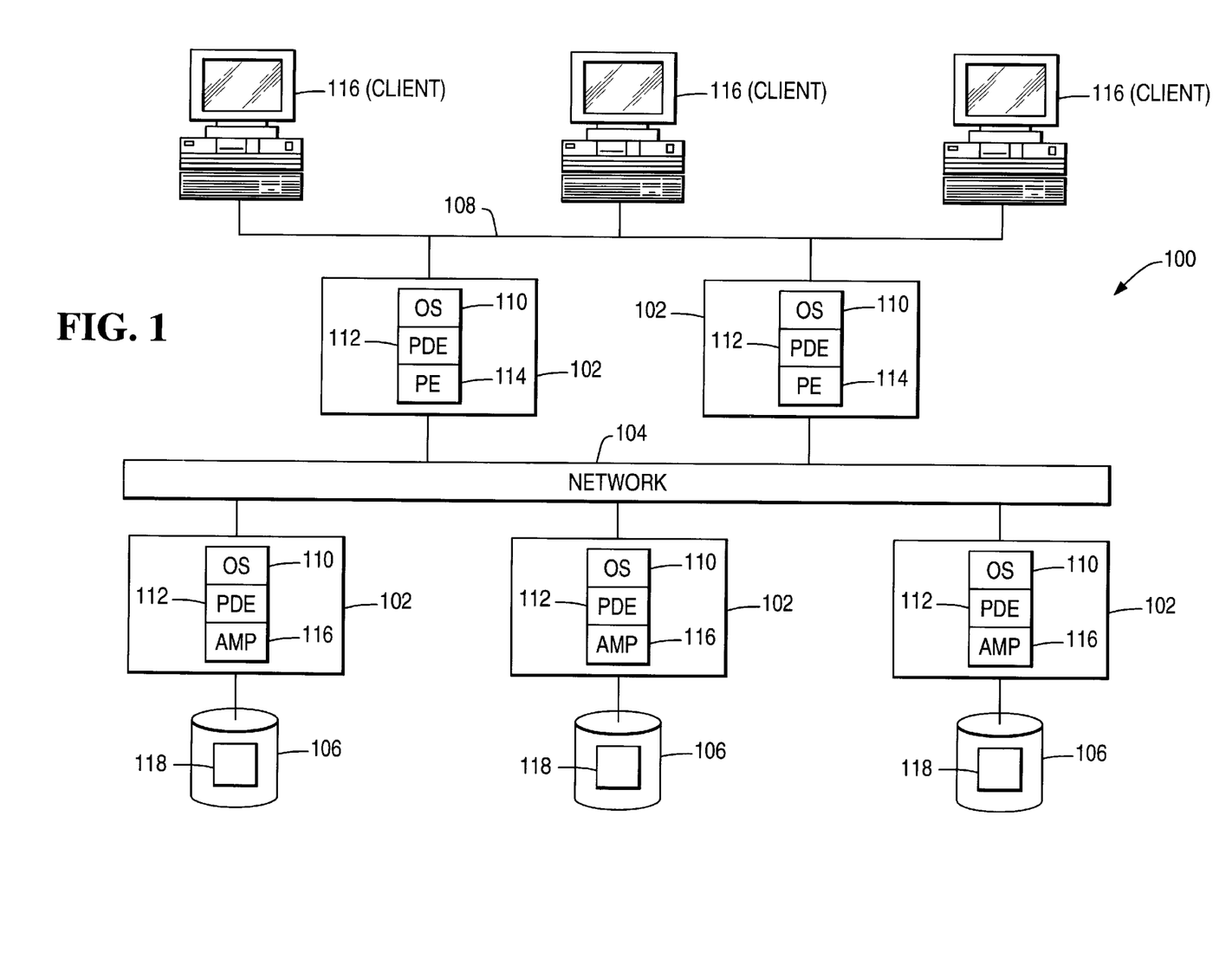
FIG. 1 is a block diagram that illustrates an exemplary computer hardware and software environment that could be used in accordance with one or more embodiments of the invention.

FIG. 1 is a block diagram that illustrates an exemplary computer hardware and software environment that could be used with one or more embodiments of the invention. In the exemplary computer hardware environment, a massively parallel processing (MPP) computer system 100 is comprised of one or more processors or nodes 102 interconnected by a network 104. Each of the nodes 102 is comprised of one or more processors, random access memory (RAM), read-only memory (ROM), and other components. It is envisioned that attached to the nodes 102 may be one or more fixed and/or removable data storage units (DSUs) 106 and one or more data communications units (DCUs) 108, as is well known in the art.

Each of the nodes 102 operates under the control of an operating system (OS) 110, such as the WINDOWS NT or UNIX MP-RAS operating systems. Further, the OS 110 controls the execution of a shared-nothing, single-image database system (DBS) comprised of Parallel Database Extensions (PDEs) 112, Parsing Engines (PEs) 114, and Access Module Processors (AMPs) 116.

The PDEs 112 provide a high speed, low latency, message-passing layer for use in communicating between the PEs 114 and AMPs 116. Further, the PDE 112 is an application programming interface (API) that allows the DBS to operate under either UNIX MP-RAS or WINDOWS NT, in that the PDE 112 isolates most of the operating system dependent functions from the DBS, and performs many operations such as shared memory management, message passing, and process or thread creation.

The PEs 114 handle communications, session control, optimization and query plan generation and control, while the AMPs 116 handle actual database 118 table manipulation. Both the PEs 114 and AMPs 116 are known as "virtual processors" or "vprocs."

The vproc concept is accomplished by executing multiple threads or processes in a node 102, wherein each thread or process is encapsulated within a vproc. The vproc concept adds a level of abstraction between the multi-threading of a work unit and the physical layout of the parallel processor computer system 100. Moreover, when a node 102 comprises a plurality of processors, the vproc provides for intra-node 102 as well as the inter-node 102 parallelism.

The vproc concept results in better system 100 availability without undue programming overhead. The vprocs also provide a degree of location transparency, in that vprocs communicate with each other using addresses that are vproc-specific, rather than node-specific. Further, vprocs facilitate redundancy by providing a level of isolation/abstraction between the physical node 102 and the thread or process. The result is increased system 100 utilization and fault tolerance.

Work is divided among the nodes 102 in the system 100 by spreading the storage of the rows of each table in a database 118 across all of the AMPs 116 and the DSUs 106 (which are managed by the AMPs 116). Thus, each DSU 106 stores some of the rows of each table in the database 118 and work is managed by the system 100 so that the task of operating on the rows is performed by the AMP 116 managing the DSUs 106 that store the specific rows. Similarly, the PEs 114 fully parallelize all functions among the AMPs 116. As a result, the system of FIG. 1 applies a multiple instruction stream, multiple data stream (MIMD) concurrent processing architecture to implement the DBS.

Generally, the OS 110, PDEs 112, PEs 114, and AMPs 116 are tangibly embodied in and/or accessible from RAM, ROM, one or more of the DSUs 106, and/or a remote device coupled to the computer system 100 via one or more of the DCUs 108. The OS 110, PDEs 112, PEs 114, and AMPs 116 each comprise logic and/or data which, when read and executed by the computer system 100, causes the computer system 100 to perform the steps necessary to execute the steps or elements of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention. In addition, it should be understood that the present invention may also apply to other computer programs than those disclosed herein.

File Segment (FSG) Subsystem Architecture

Figure 2:
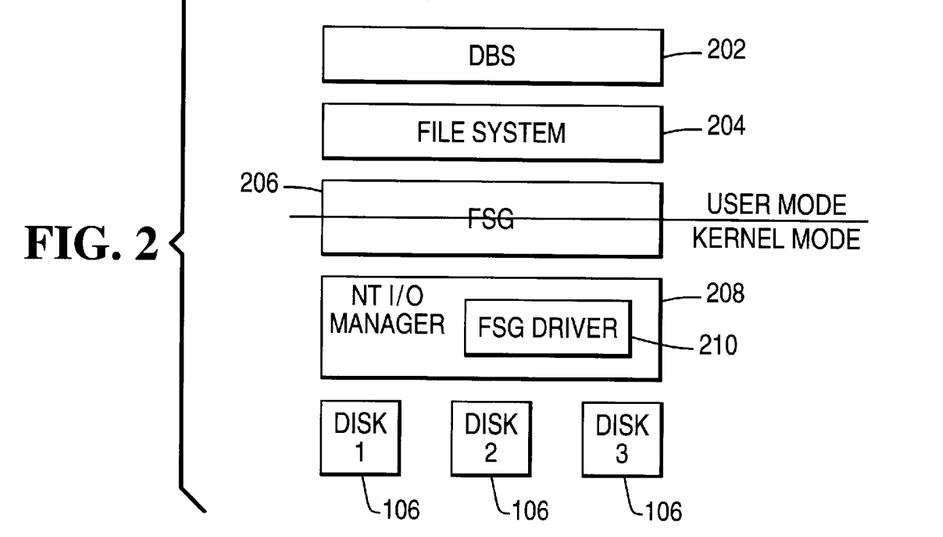
FIG. 2 illustrates the architecture for utilizing the FSG subsystem in accordance with one or more embodiments of the invention.

FIG. 2 illustrates the architecture for utilizing the FSG subsystem in accordance with one or more embodiments of the invention. Data is stored in data storage units/disks 106. However, instead of performing a disk I/O every time the data is needed, the data may be placed into cache managed by the FSG subsystem 206. The FSG subsystem 206 is a component of PDE 112. The file system 204, FSG Driver 210 and NT I/O manager are components of OS 110. The file system 204 is the consumer for the services (application programming interface) provided by FSG 206. The file system 204 provides a logical view of the database in the form of rows, tables, etc. to the database system (DBS) 202. AMPs 116 located within DBS 202 commonly utilize cache and information provided by file system 204 and FSG 206. Additionally, a PE 114 may exist within DBS 202.

The file system 204 maintains master indices and cylinder indices to translate the table or row references into a disk 106 address where the actual table resides. The FSG subsystem 206 provides routines to manage databases (stored on disks 106) to the file system 204 and other subsystems of PDE 112. The FSG 204 uses the services (e.g., FSG driver 210) provided by NT I/O Manager 208 (e.g., the operating system 110) to achieve this functionality.

Cache Allocation and Management

Overview

To ensure that permanent information that is needed is not swapped out of cache by the operating system 110 or another application, FSG 206 manages and controls a portion of the cache. Further, FSG 206 optimizes the disk 106 I/O operations by providing efficient cache management. FSG 206 obtains (i.e., is allocated) a stipulated amount of cache from where it allocates the segments to the processes on request. The cache is reserved and locked by FSG 206 such that no other applications can swap or utilize the cache unless permitted by FSG 206. On completion of the operations with the data in the cache, the segment is released to FSG 206. Instead of FSG 206 destroying the segment memory immediately, FSG 206 keeps the segment until FSG 206 requires the physical memory (referred to as aging). Additionally, FSG 206 provides routines to perform I/O operations on the disk 106 and to retrieve information about FSG 206 global variables and cache.

Figure 3:
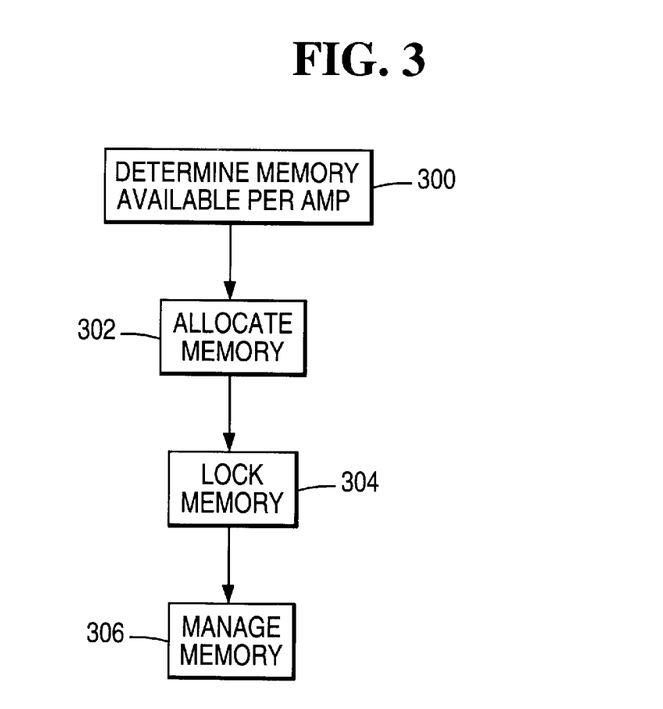
FIG. 3 is a flow chart illustrating some of the general tasks provided by the FSG subsystem in accordance with one or more embodiments of the invention.

FIG. 3 is a flow chart illustrating some of the general tasks provided by FSG 206. At step 300, the amount of memory/cache that can be utilized by the FSG 206 on a per AMP 116 basis that does not need to be returned to the operating system 110 is determined. The cache is allocated at step 302 and locked at step 304. At step 306, the locked memory is managed by FSG 206.

Details

Figure 4:
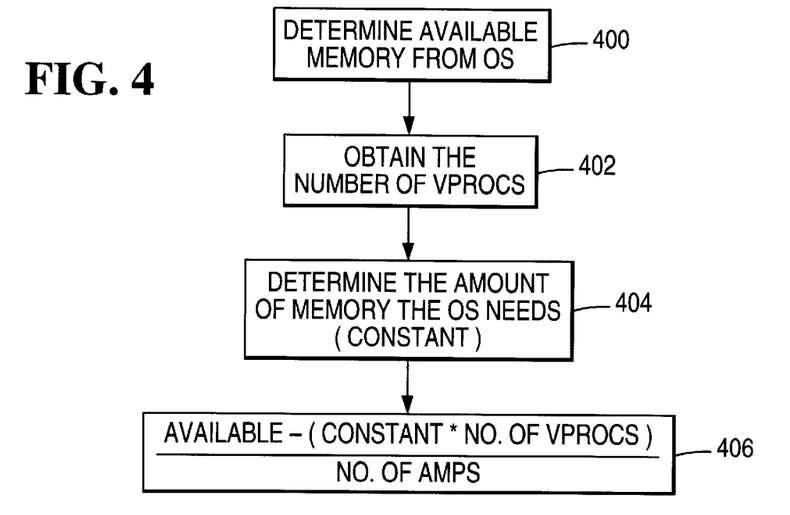
FIG. 4 is a flow chart illustrating the details of determining available memory in accordance with one or more embodiments of the invention.

Step 300 of FIG. 3 provides for determining the amount of memory available on a per AMP 116 basis. FIG. 4 is a flow chart illustrating the details of step 300. At step 400, FSG 206 queries the operating system 110 (e.g., Windows NT) to determine the amount of available memory/cache. At step 402, the FSG 206 determines how many total vprocs (e.g., AMPs 116 and PEs 114) are going to run in nodes 102. At step 404, FSG 206 determines the amount of memory (e.g., the number of pages) that the operating system 110 (e.g., Windows NT) needs/uses per process. For example, the operating system 110 may utilize 40 MB per process. Step 404 may be accomplished through trial and error during which more or less cache is taken by FSG 206 to determine if the system fails/crashes. If the system fails, too much memory was taken by FSG 206 from the operating system. To determine the amount of cache that may be utilized by FSG 206, the values obtained in steps 400–404 are utilized in the equation of step 406. The constant (from step 404) is multiplied by the number of vprocs (from step 402) to obtain the total amount of memory needed by the operating system for all processes (vprocs). The total amount of memory needed is subtracted from the available memory (from step 400) to determine how much memory may be utilized by FSG 206. The result is then divided by the number of AMPs 116 to determine how much memory can be utilized per AMP 116.

Once the appropriate amount of memory available per AMP 116 is determined at step 300, the determined amount of cache is allocated by the FSG 206 at step 302. The cache is then locked at step 304 such that the OS 110 cannot swap out the data in the allocated portion of cache. Thereafter, the memory is managed by FSG 206 at step 306.

A segment (in cache) is the basic unit of memory provided by the FSG 206 for the applications (and AMPs 116). Buddy memory management may be utilized to manage 306 the cache. Buddy memory management provides for dividing memory into two large areas, and those areas are further split into two smaller areas, and so on. This hierarchical division of memory may be used to constrain where AMPs 116 are allocated, what their allowable sizes are, and how they may be coalesced into larger free areas. A free block of memory may only be merged/coalesced with its buddy, which is its unique neighbor at the same level in the binary hierarchy division. The resulting free block is therefore always one of the free areas at the next higher level in the memory-division hierarchy. At any level, the first block may only be merged with the following block, which follows it in memory. Conversely, the second block may only be merged with the first, which precedes it in memory. This constraint on coalescing ensures that the resulting merged free area will always be aligned on one of the boundaries of the hierarchical splitting.

Figure 5:
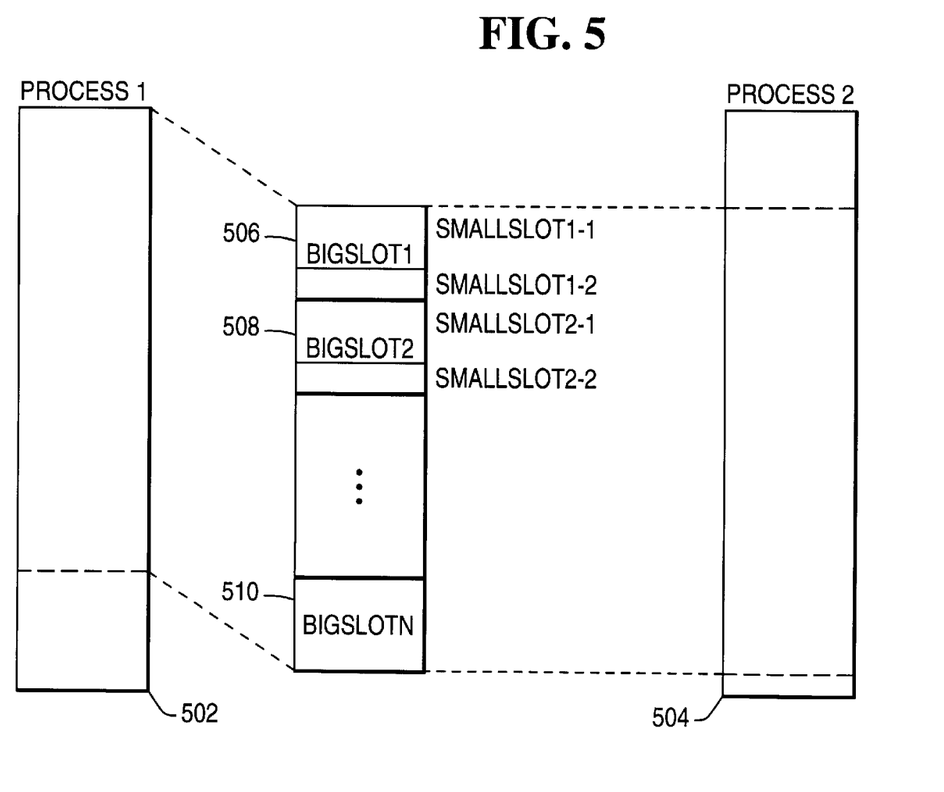
FIG. 5 illustrates buddy memory management in accordance with one or more embodiments of the invention.

The FSG 206 may manage cache segments in six different sizes (all of 4K*power of 2): 4K, 8K, 16K, 32K, 64K, and 128K. FIG. 5 illustrates buddy memory management in accordance with one or more embodiments of the invention. The 4K slots of memory are referred to as smallslots (i.e., SMALLSLOT 1-1, SMALLSLOT 1-2, SMALLSLOT 2-1, SMALLSLOT 2-2, etc.). The 128K slots are referred to as bigslots 506–510. During initialization of FSG 206, a specified number of bigslots 506–510 are allocated. The number of bigslots 506–510 is determined as described in FIG. 4 and depends on the available physical memory and the number of AMPs 116. The required number of pages (i.e., the number of bigslots 506–510\*bigslot 510–514/4) are paged into memory and will never be paged out. Every process 502–504 of the vproc maps the FSG 206 cache to its own process address space. Separate lists of free slots are maintained for 4K, 8K, 16K, 32K, 64K, and 128K. Whenever a segment is requested, FSG 206 tries to allocate a free slot that is next to the requested size. If a free slot is not available, FSG 206 splits the next bigger free slot into a combination of the above mentioned sizes, as required. When the memory is freed up, FSG 206 attempts to coalesce the segment with its buddy. Two slots of different bigslots 506–510 cannot be coalesced.

The following example better illustrates buddy memory management in accordance with the invention. 'N' number of biglsots 506–510 are allocated at the time of initialization of FSG 206. To simplify, assume that four segments of the size 64K are requested. The following is the sequence of steps executed:

There is a request to acquire a slot of size 64K.

Since all of the free slots are bigslots 506–510, split slot1 506 into two 64K slots, slot 1-1 and slot 1-2.

Allocate slot1-1.

Add the slot1-2 to the free list of 64K.

There is a request to acquire a slot of size 64K.

Since there is a free slot of size 64K, allocate slot 1-2.

There is a request to acquire a slot of size 64K.

Since all of the free slots are bigslots 506–510, split slot2 508 into two 64K slots, slot 2-1 and slot 2-2.

Allocate slot 2-1.

Add slot 2-2 to the free list of 64K.

There is a request to acquire for a slot of size 64K.

Since there is a free slot of size 64K, allocate slot 2-2.

Release slot 1-2.

There are no free slots of 64K. This slot cannot be coalesced. Add slot 1-2 to the free list of 64K.

Release slot 2-1.

There is a free slot of 64K (slot 1-2). But slot 1-2 and slot 2-1 are not of the same bigslot 506–510 and thus cannot be coalesced. Add slot 2-1 to the free list of 64K.

Release slot 2-2.

Slot 2-2 can be coalesced with slot 2-1 to form slot2 508 of 128K. The slot 1-1 is the buddy to slot 1-2 and vice versa. Slot 2-1 is the buddy to slot 2-2 and vice versa.

Using a buddy memory management system, every piece of cache allocated to FSG 206 is either free or represents a block of data in the database 106. In combination with the buddy management system, various features of a segment may be utilized to provide one or more services to a process 502–504 or node 102. Such features may include access, action, age, attributes, class, and lock.

The access feature indicates the type of access requested for a segment and can include read-only, read-write, and read-write-new (to specify read-write access on a non-initialized segment).

The action feature specifies the special action that is to be taken (by PDE 112) after performing an indicated I/O on the segment. The caller can specify the action feature. Actions may include none, release (to release the segment after the write I/O is complete), reaccess (to change the access mode to a specified value after the I/O is complete), and relock (to change the segment's lock to that specified after the I/O is complete). Accordingly, a user/caller can specify the action to be taken after completing an I/O operation and may continue operation without concerning itself regarding the synchronous aspect of action execution and the completion of the action. The PDE 112 is then responsible for ensuring the action is performed in the proper context. Thus, the user does not need to wait until an I/O is complete before sending the special action to be performed. For example, if the user specifies release, the segment may be placed into a queue for use by other segments (see the age chain description below).

The attributes feature may include various miscellaneous attributes used by FSG 206. Attributes may include none, redundant (indicating the segment is duplicated), ageless (indicating that the segment should never be aged out (see below)), needstrash (indicating the segment must be destroyed immediately), and vprocwide (indicating the segment should be mapped to the vproc wide virtual address space).

A process referred to as "aging" is utilized to determine which data remains in cache and which data is swapped out. The aging process may utilize numerous features including the "age" feature and one or more of the miscellaneous attributes features. A segment is called active when there is at least one task referring to it. When there are no tasks referring to a segment, the segment becomes inactive and the memory allocated to the segment is to be freed. To achieve better performance, FSG 206 may not release the memory immediately upon the release of a segment by a task. Instead, FSG 206 may place the segment in a chain called "age chain". Whenever FSG 206 needs physical memory, the segments in the age chain are destroyed based on the least recently used. The user of the segment can specify the aging policy. Aging policies can include agenormal (indicating the segment to be chained and destroyed normally), ageoutnow (indicating the segment is to be destroyed immediately when the reference count becomes zero), preload, and ageless (indicating the segment can never be destroyed).

By utilizing an age chain queue, segments are placed into a queue when released by a process/task 502–504. Accordingly, segments towards the tail/end of the age chain have been in the queue/chain the shortest amount of time and segments towards the head/beginning of the age chain have been in the queue/chain the longest amount of time. When memory is needed, the segment at the head/front front of the queue is utilized first. Accordingly, the least recently used (LRU) segment is the first segment to be reused. Further, when a segment is used again, the aging process for that segment restarts and the segment may be placed at the tail of the queue depending on the aging policy selected.

Both agenormal and preload are placed into the queue as identified above. An agenormal segment is an indication that the user does not currently need the segment, but there may be a chance that the segment is needed again. Accordingly, an agenormal segment should be aged normally and released when its time comes (i.e., using the least recently used protocol). A preload segment provides for placing data from database 106 into the cache segment prior to being utilized. Identifying the segment's age feature as preload may indicate that the segment has not yet been accessed. Preloaded segments attempt to anticipate when data from database 106 will be utilized. Such segments are aged normally. Further, once a preloaded segment has been accessed, the segment's age may change to normal or ageoutnow as identified by the action feature.

If a segment's age feature is ageoutnow, the user is indicating that the segment is no longer needed and it may be thrown out from the cache. If the segment's age is ageless, the segment is not placed into the age chain and the segment is never destroyed/removed from cache.

Thus, in view of the age feature, normal and preload segments may be placed into an age chain for release using the least recently used protocol. Additionally, segments identified as ageoutnow are released prior to normal and preloaded segments.

Instead of immediately processing the age chain or waiting until no more cache is available prior to processing the age chain and releasing/freeing cache, FSG 206 may utilize threshold levels. Threshold levels provide for a bottom threshold level identifying the minimum amount of free cache that should be maintained and an upper limit that identifies an upper level of free cache. When the bottom threshold level has been reached, a daemon is woken up. The daemon begins processing the age chain and freeing up cache until the upper limit has been reached. Once the upper limit of free cache has been reached, the daemon goes back to sleep until woken again. Using the threshold levels, a consistent amount of free cache is maintained for use by AMPs 116.

The age chain and the cache are maintained in hash queues/buckets of identifiers (addresses) by FSG 206. Upon a data access request, FSG 206 examines the hash queues to determine if the data is currently in cache. FSG 206 also determines if the requested access contradicts a lock on the data. If there is a lock contradiction, the data access request may be denied. If there is no lock contradiction and the data is in cache, the data access request may be granted and performed using the cache. Further, if there is no lock contradiction and the data is not in cache, the data will be read into cache. To determine which cache segment to place the data into from database 106, a hash queue of available segments may be examined as described above with respect to buddy memory management.

Figure 6:
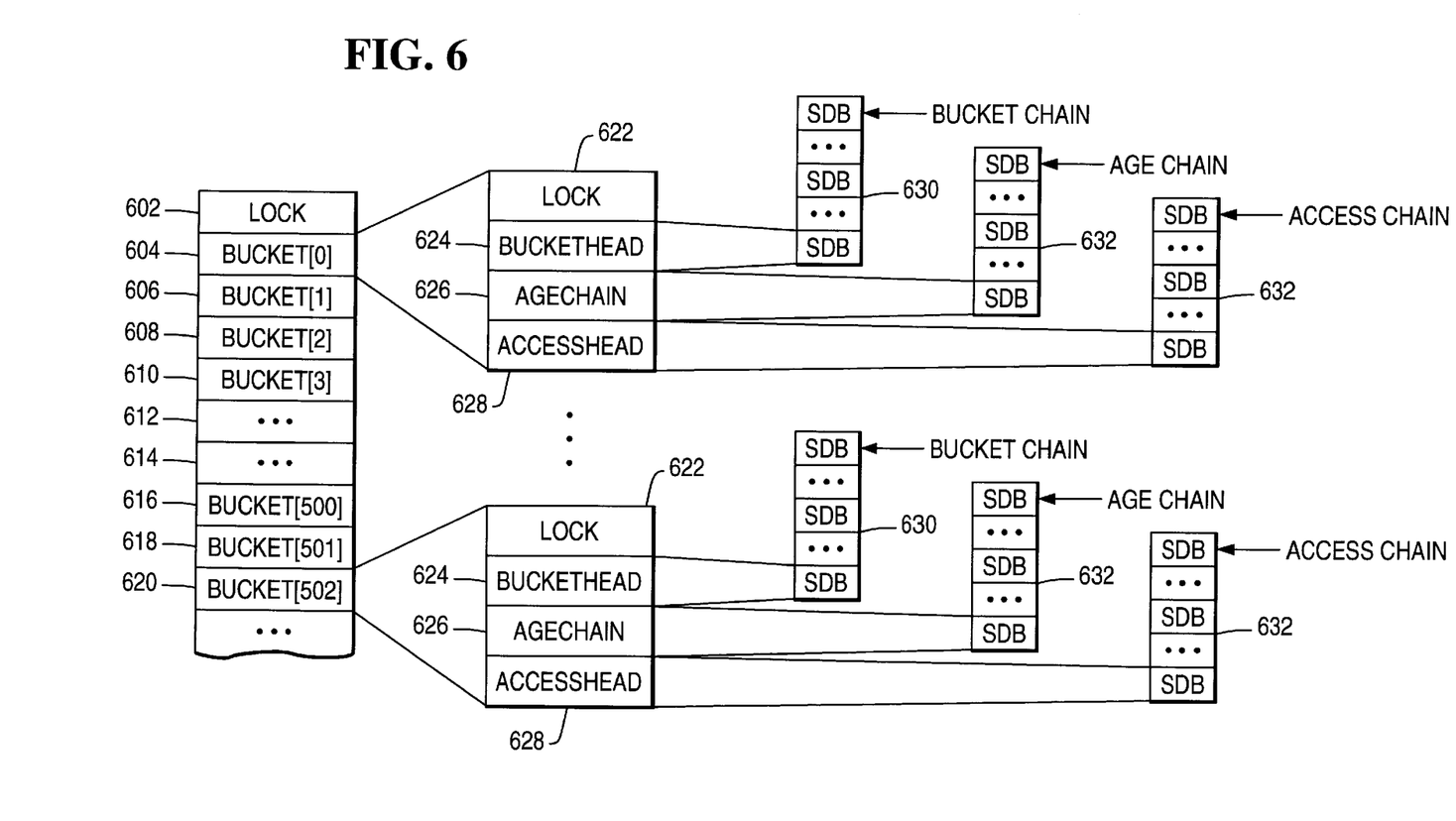
FIG. 6 illustrates an index structure and the various hash queues/chains in accordance with one or more embodiments of the invention.

FIG. 6 illustrates an index structure and the various hash queues/chains. All segments may be hashed on a segment id. An array of hash buckets 604–620 is maintained by FSG 206. The index structure may contain a lock 602 for determining access rights for the index structure. The index structure 602–620 may utilize a separate age chain or aging process since the index structure is more likely to be reused than the data stored in the remaining cache. Each hash bucket 604–620 has a pointer to three chains: the bucket chain 630, the age chain 632, and the access chain 634.

All of the segments that are hashed are hashed to the bucket chain 630. The bucket chain 630 contains SDBs (segment descriptor blocks that describe the segment) for every segment in the cache. The total number of the segments in the bucket chain 630 must be equal to the sum of the elements in the age chain 632 and access chain 634.

The age chain 632 contains SDBs for the segments in its chain. When the reference count of the segment becomes zero and based on the age flags (e.g., the age feature), the segment is removed from the accessed chain 634 and either entered into the age chain 632 or destroyed. Age normal segments are added at the end of the age chain 632. Consequently, the segments at the head of the age chain 632 are aged out first. As described above, a segment with attribute ageless or ageoutnow may not be placed in the age chain 632. An ageless segment will never be discarded and an ageoutnow segment will be discarded as soon as the reference count becomes zero (or when the reference count reaches the low threshold level).

Access chain 634 contains SDBs for the segments that are currently being accessed by any task (i.e., the reference count is greater than zero).

A bucket lock 622 is provided to lock all of the chains 630–634 for synchronization between tasks. The buckethead 624 is the first element of a bucket chain 630. Similarly, the agehead 626 and accesshead 628 are the first elements of the age chain 632 and the access chain 634 respectively.

Accordingly, when the aging process begins, FSG 206 examines the type of segment (e.g., index structure 602–620 v. memory cache page/block) and the aging value to determine which segment to age out first.

Figure 7A:
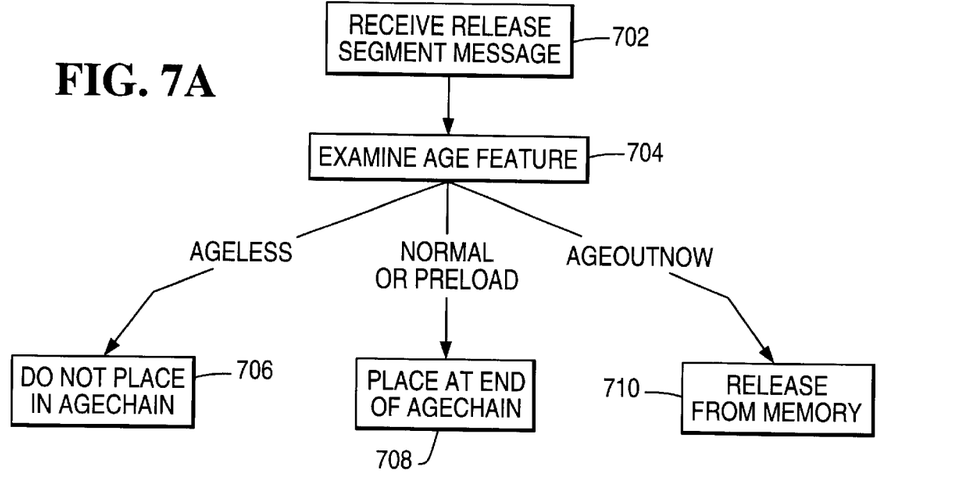
FIGS. 7A and 7B are flowcharts illustrating the use of an age chain and the aging process in accordance with one or more embodiments of the invention.
Figure 7B:
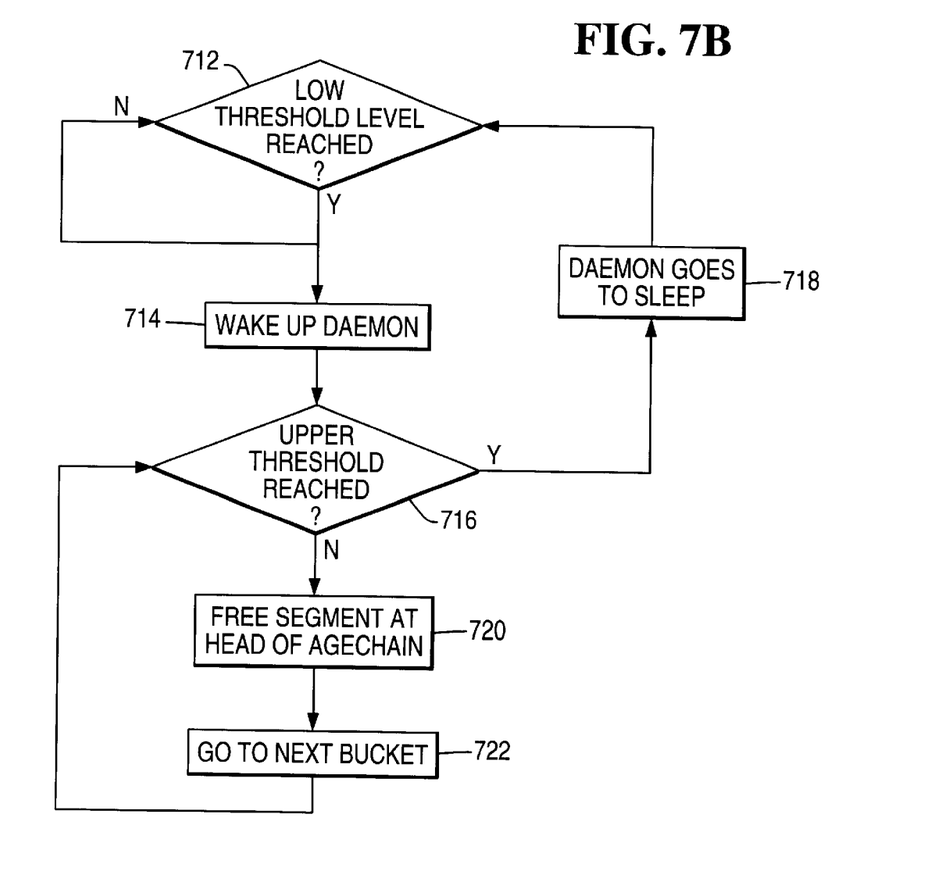

FIGS. 7A and 7B are flowcharts illustrating the use of the age chain 632 and the aging process. FIG. 7A illustrates the release of a segment by a task 502–504 and the placement of the segment into the age chain 632. At step 702, FSG 206 receives the release segment message from the task 502–504. At step 704, FSG 206 examines the age feature 704. If the age feature is ageless, the segment is not placed into the age chain 632 and remains in the access chain 634 at step 706. If the age feature is normal or preload, the segment (i.e., the SDB for the segment) is placed at the end of the age chain 632 at step 708. If the age feature is ageoutnow, the segment (i.e., the SDB for the segment) is released from memory at step 710.

FIG. 7B illustrates the aging process. At step 712, a determination is made regarding whether the low cache threshold level has been reached. The process does not continue until the low cache threshold level has been reached. If the low cache threshold level has been reached a daemon of FSG 206 is woken up at step 714. At step 716, a determination is made regarding whether the upper cache threshold level has been reached. If not, the segment at the head of the age chain 632 is released at step 720, the process goes to the next bucket at step 722 and continues at step 716. If the upper threshold level has been reached, the daemon goes back to sleep at step 718 and the process continues at step 712.

As described, embodiments of the invention provide a cache management system for controlling cache while maintaining a finer degree of control over shared memory resources and allowing implementers of a database to maintain a maximum amount of common code and function between two disparate platforms.

Conclusion

This concludes the description of one or more embodiments of the invention. The following paragraphs describe some alternative embodiments for accomplishing the same invention.

In one alternative embodiment, any type of computer, such as a mainframe, minicomputer, or personal computer, could be used to implement the present invention. In addition, programs other than relational database management systems (including but not limited to operating systems, memory managers, etc.) could benefit from the present invention.

In summary, the present invention discloses a subsystem for obtaining and managing cache memory segments by utilizing a buddy management system in combination with an aging process and asynchronous I/O actions.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

what is claimed is:

1. A method of managing cache segments in a computer system comprising:
    (a) determining the amount of cache available in an operating system;
    (b) allocating the determined amount of cache to a subsystem;
    (c) locking the allocated cache;
    (d) managing the cache using:
        (i) buddy memory management to provide a cache segment to a requester; and
        (ii) an aging process wherein a feature of each cache segment identifies an aging policy for swapping data; and
    (e) performing a special action specified by the requester.

2. The method of claim 1 wherein the determining comprises:
    determining the available memory from the operating system;
    determining a constant comprising the amount of memory the operating system needs;
    obtaining the number of processes;
    multiplying the constant by the number of processes to obtain the total memory needed by the operating system for all processes;
    subtracting the total memory needed from the amount of available memory to obtain the amount of cache available.

3. The method of claim 2 further comprising determining the amount of cache available on a per AMP and PE basis comprising:
    determining the number of AMPs and PEs; and
    dividing the amount of cache available by the number of AMPs and PEs.

4. The method of claim 1 wherein the aging process comprises:
    receiving a release segment message from the requester;
    examining an age feature of the cache segment;
    placing a reference to the cache segment in an appropriate hash queue based on the age feature.

5. The method of claim 4 wherein the age feature is ageless and the reference is placed in an access chain.

6. The method of claim 4 wherein the age feature is normal and the reference is placed at the end of an age chain.

7. The method of claim 4 wherein the age feature is preload and the reference is placed at the end of an age chain.

8. The method of claim 4 wherein the age feature is ageoutnow and the reference is placed at the head of an age chain.

9. The method of claim 1 wherein the aging process comprises freeing a cache segment located at the head of an age chain.

10. The method of claim 9 wherein the freeing occurs when a low threshold level of available cache segments has been reached.

11. The method of claim 10 further comprising freeing additional cache segments from the head of the age chain until an upper threshold of available cache segments has been reached.

12. The method of claim 1 wherein the special action changes the aging policy.

13. The method of claim 1 wherein the operating system is Windows NT.

14. A system for managing cache segments in a computer comprising:
    (a) an operating system;
    (b) one or more cache segments managed by the operating system;
    (c) a subsystem configured to:
        (i) determine the amount of cache available in an operating system;
        (ii) allocate the determined amount of cache to a subsystem;
        (iii) lock the allocated cache;
        (iv) manage the cache using:
            (1) buddy memory management to provide a cache segment to a requestor; and
            (2) an aging process wherein a feature of each cache segment identifies an aging policy for swapping data; and
        (v) perform a special action specified by the requestor.

15. The system of claim 14 wherein the determining comprises:
   determining the available memory from the operating system;
   determining a constant comprising the amount of memory the operating system needs;
   obtaining the number of processes;
   multiplying the constant by the number of processes to obtain the total memory needed by the operating system for all processes;
   subtracting the total memory needed from the amount of available memory to obtain the amount of cache available.

16. The system of claim 15, the subsystem further comprising determining the amount of cache available on a per AMP and PE basis comprising:
   determining the number of AMPs and PEs; and
   dividing the amount of cache available by the number of AMPs and PEs.

17. The system of claim 14 wherein the aging process comprises:
   receiving a release segment message from the requestor;
   examining an age feature of the cache segment;
   placing a reference to the cache segment in an appropriate hash queue based on the age feature.

18. The system of claim 17 wherein the age feature is ageless and the reference is placed in an access chain.

19. The system of claim 17 wherein the age feature is normal and the reference is placed at the end of an age chain.

20. The system of claim 17 wherein the age feature is preload and the reference is placed at the end of an age chain.

21. The system of claim 17 wherein the age feature is ageoutnow and the reference is placed at the head of an age chain.

22. The system of claim 14 wherein the aging process comprises freeing a cache segment located at the head of an age chain.

23. The system of claim 22 wherein the freeing occurs when a low threshold level of available cache segments has been reached.

24. The system of claim 23, the subsystem further comprising freeing additional cache segments from the head of the age chain until an upper threshold of available cache segments has been reached.

25. The system of claim 14 wherein the special action changes the aging policy.

26. The system of claim 14 wherein the operating system is Windows NT.

27. An article of manufacture embodying logic for implementing a method for managing cache segments in a computer system, the method comprising:
   (a) determining the amount of cache available in an operating system;
   (b) allocating the determined amount of cache to a subsystem;
   (c) locking the allocated cache;
   (d) managing the cache using:
      (i) buddy memory management to provide a cache segment to a requestor; and
      (ii) an aging process wherein a feature of each cache segment identifies an aging policy for swapping data; and
   (e) performing a special action specified by the requester.

28. The article of manufacture of claim 27 wherein the determining comprises:
   determining the available memory from the operating system;
   determining a constant comprising the amount of memory the operating system needs;
   obtaining the number of processes;
   multiplying the constant by the number of processes to obtain the total memory needed by the operating system for all processes;
   subtracting the total memory needed from the amount of available memory to obtain the amount of cache available.

29. The article of manufacture of claim 28, the method further comprising determining the amount of cache available on a per AMP and PE basis comprising:
   determining the number of AMPs and PEs; and
   dividing the amount of cache available by the number of AMPs and PEs.

30. The article of manufacture of claim 27 wherein the aging process comprises:
   receiving a release segment message from the requester;
   examining an age feature of the cache segment;
   placing a reference to the cache segment in an appropriate hash queue based on the age feature.

31. The article of manufacture of claim 30 wherein the age feature is ageless and the reference is placed in an access chain.

32. The article of manufacture of claim 30 wherein the age feature is normal and the reference is placed at the end of an age chain.

33. The article of manufacture of claim 30 wherein the age feature is preload and the reference is placed at the end of an age chain.

34. The article of manufacture of claim 30 wherein the age feature is ageoutnow and the reference is placed at the head of an age chain.

35. The article of manufacture of claim 27 wherein the aging process comprises freeing a cache segment located at the head of an age chain.

36. The article of manufacture of claim 35 wherein the freeing occurs when a low threshold level of available cache segments has been reached.

37. The article of manufacture of claim 36, the method further comprising freeing additional cache segments from the head of the age chain until an upper threshold of available cache segments has been reached.

38. The article of manufacture of claim 27 wherein the special action changes the aging policy.

39. The article of manufacture of claim 27 wherein the operating system is Windows NT.

* * * * *